M. J. G. SCHOEDELIN.
POWER TRANSMISSION MECHANISM.
APPLICATION FILED JAN. 11, 1913.
1,106,246.
Patented Aug. 4, 1914.
2 SHEETS—SHEET 1.
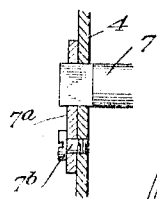
Fig. 8.
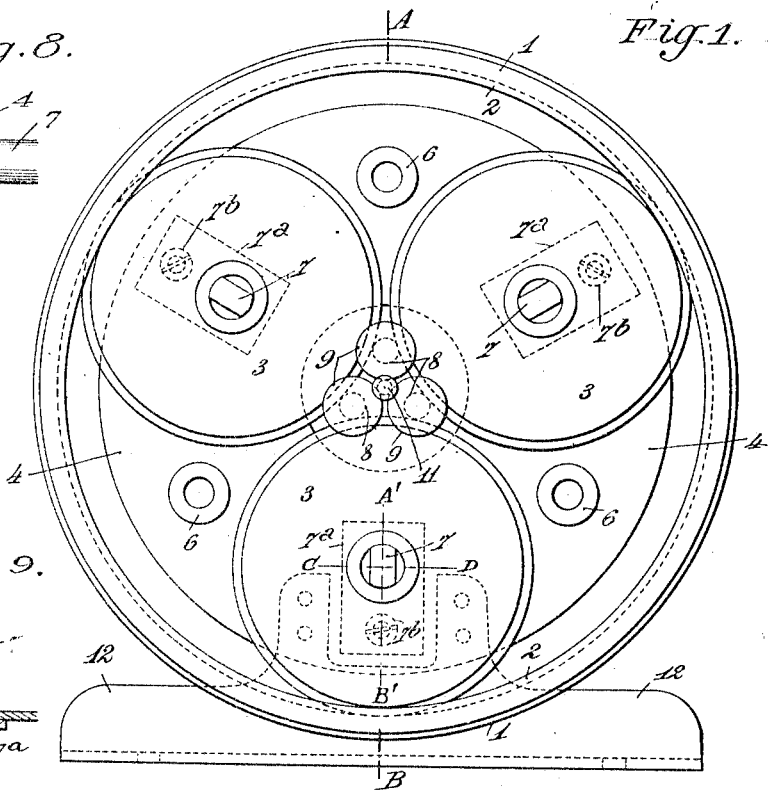
Fig. 1.
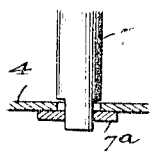
Fig. 9.
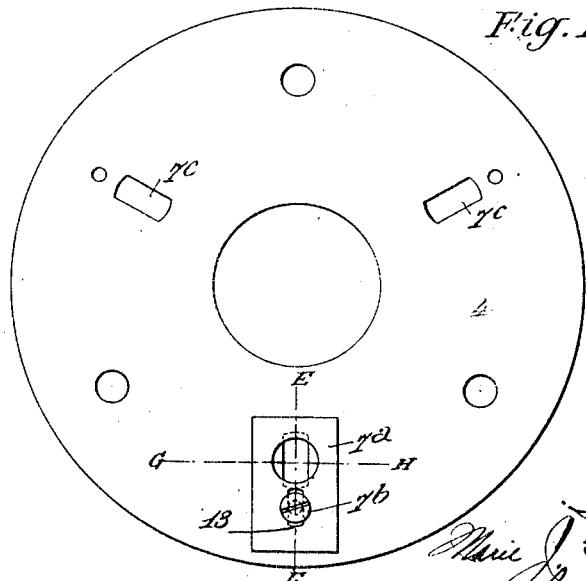
Fig. 2.
Fig. 10.
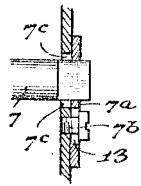
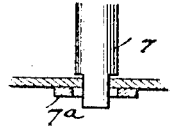
Fig. 11.

M. J. G. SCHOEDELIN.
POWER TRANSMISSION MECHANISM.
APPLICATION FILED JAN. 11, 1913.
1,106,246.
Patented Aug. 4, 1914.
2 SHEETS—SHEET 2.
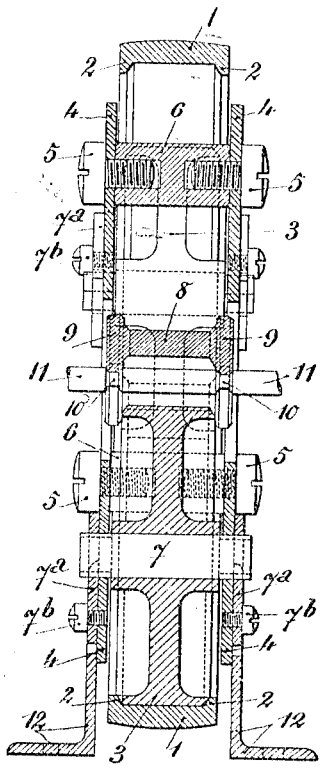
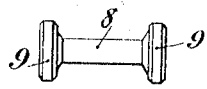
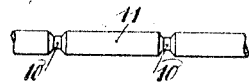
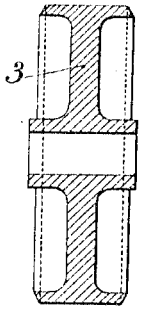
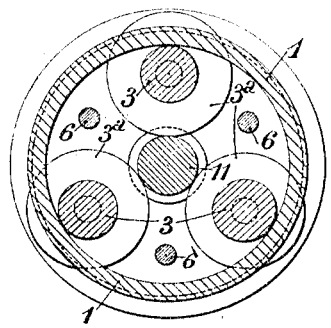

UNITED STATES PATENT OFFICE.

MARIE JOSEPH GASTON SCHOEDELIN, OF PARIS, FRANCE.

POWER-TRANSMISSION MECHANISM.

1,106,246.

Specification of Letters Patent. Patented Aug. 4, 1914.

Application filed January 11, 1913. Serial No. 741,517.

*To all whom it may concern:*

Be it known that I, MARIE JOSEPH GASTON SCHOEDELIN, citizen of the Republic of France, residing at Paris, France, have invented new and useful Improvements in Power-Transmission Mechanism, of which the following is a specification.

This invention relates to a power transmission mechanism without toothed wheels, whereby starting from a member rotating at a low speed, another member is caused to rotate at a very high speed, for instance 100,000 revolutions per minute, so that, for insance, the shaft of a steam turbine rotating at a very high speed, transmits power to a member rotating very slowly, without the intermediate parts employed, which are very simple, absorbing a considerable amount of the power.

The invention is also characterized by the parts used being designed so that they remain of themselves in one and the same plane.

Other characteristic features of the invention will appear in the course of the description.

In order to make this invention clearly understood, the specification is accompanied by a drawing, given merely by way of example, in which—

Figure 1 is a front elevation of the apparatus with one of its sides removed, Fig. 2 is a cross-section on line A—B of Fig. 1, Fig. 3 is a longitudinal view of a "multiplying" or gear roller, Fig. 4 is a view of the central shaft, Fig. 5 is a longitudinal section of the rollers in contact with the rim, Fig. 6 is a longitudinal section of a modified construction of the rolling mechanism, and Fig. 7 is a modified construction of the sides or frames of the apparatus, in order to provide for regulation of the position of the spindles or pins of the rollers which are in direct contact with the rolling rim.

In the said drawing (Figs. 1–6) 1 is a rim provided at each side with a flange 2 extending inward and intended to prevent any lateral movement relatively to the rim, of the rollers 3 which it contains. These rollers 3 are preferably in the number of three, and their pins or spindles are supported by the sides 4 arranged at each side of the rolling mechanism. The sides 4 are connected together by screws 5 engaging with braces or stays 6. The ends of the pins 7 of the rollers 3 are provided with flattened portions and engage with round holes in the sides 4. In order to prevent the said pins 7 either from moving longitudinally or from rotating, the ends with flattened portions are engaged with plates $7^a$ held in place by screws $7^b$. The rollers 3 which are in contact with the inner periphery of the rim 1, are also in contact with the central portion 8 of multiplying or gear rollers provided with flanges 9. These flanges are intended to prevent any longitudinal movement of the rollers, and are also in contact with the bottom of annular grooves 10 provided in the shaft 11.

It will be understood that, owing to the great difference that exists in the diameters of the rim 1 and of the rollers 3, the latter will rotate at a speed already very much higher than that of the said rim, that moreover the rolls 8 will rotate at a speed much higher than that of the rollers, and that the speed with which they rotate, is transmitted with a very large increase to the shaft 11, by the flanges 9 with which they are provided and which engage with it grooves 10 of very small diameter made in the shaft 11. With apparatus thus constructed, it is easily possible to obtain a speed of rotation of the shaft 11 equal to 100,000 revolutions per minute.

It will be seen from the foregoing that the shaft 11 is held in position of the device as illustrated in Figs. 1 and 2 merely by the parts which drive it, which does away with any supports in which it would be exposed to friction.

In the construction shown in Fig. 6, the rim 1 drives the rollers 3 which are prevented from moving in the longitudinal direction by the cheeks $3^a$ with which they are provided at their ends, and the said cheeks $3^a$ engage with grooves made in the shaft 11 to be driven. In that way a very high speed of the latter is obtained with an exceedingly simple construction.

The sides 4 could be designed so as to render possible regulation of the position of the rollers 3 in the construction of the mechanism shown in Figs. 1 and 2, and to that end, the screws $7^b$ are carried through elongated holes 13 of plates $7^a$ (Fig. 7). On the contrary, the holes through which the pins 7 pass in said plates *a*, are circular, while the holes $7^c$ of the sides 4 are elongated.

Having now particularly described and ascertained the nature of my said invention and in what manner the same is to be performed, I declare that what I claim is:—

1. Power transmission device of the character described, comprising in combination, an elastic rim adapted to be rotated, rollers within said rim in frictional engagement with the inner periphery of the same, a driven shaft between said rollers provided with grooves for positioning said rollers within said rim, side plates for said rim, and means for connecting said side plates, substantially as described.

2. Power transmission mechanism comprising in combination, an outer elastic rim adapted to be rotated, rollers within said rim, means for positioning said rollers within said rim, and for supporting the shafts thereof within said rim, rollers in the center of said rim having their central portions in frictional contact with said first named rollers, and a driven shaft between said second named rollers adapted to be driven at a high rate of speed, substantially as described.

3. Power transmission mechanism comprising in combination, an outer elastic rim adapted to be rotated and provided with a flange at each side thereof, rollers within said rim, frictionally guided against the same between the flanges thereof, shafts for said rollers, side plates for said rim providing bearings for the shafts of said rollers through which said shafts extend, means for connecting said side plates, means for rigidly securing said shafts within their bearings, a second set of rollers in the center of said rim provided with flanges and having their central portions in contact with said first set of rollers, and a driven shaft centrally located between said second set of rollers and provided with grooves adapted to be engaged by the flanges of said second set of rollers for driving said shaft at a high rate of speed.

4. Power transmission mechanism comprising in combination, an outer elastic rim adapted to be rotated provided with a flange at each side thereof, rollers within said rim frictionally guided against the same between the flanges thereof, shafts for said rollers, side plates for said rim constituting bearings for the shafts of said rollers and provided with holes through which said shafts extend with their flattened ends, means for connecting said side plates, plates upon said flattened ends and screws to secure said plates upon said ends for rigidly securing said shafts within their bearings, a second set of rollers in the center of said rim provided with flanges and having their central portions in frictional contact with said first set of rollers, and a driven shaft centrally disposed between the rollers of said second set and provided with annular grooves of small diameter adapted to be engaged by the flanges of the rollers of the second set for driving said shaft at a high rate of speed.

5. Power transmission device of the character described comprising in combination, an elastic rim adapted to be rotated and provided with flanges, rollers within said rim in frictional engagement with the same between the flanges thereof, side plates for said rim, means for connecting said plates, shafts for said rollers extending with their flattened ends through said side plates, pins upon the ends of said shafts, plates upon said ends provided with elongated slots, screws extending through said slots and engaging said pins, for allowing a regulation of the position of said shafts and rollers, means in frictional engagement with said rollers, and a driven shaft provided with grooves adapted to be engaged by said means frictionally engaging said rollers for driving said driven shaft at a high rate of speed, substantially as described.

In testimony whereof I affix my signature in presence of two witnesses.

MARIE JOSEPH GASTON SCHOEDELIN.

Witnesses:
 JULES BEL,
 HANSON C. COXE.